United States Patent [19]

Baumgartner et al.

[11] Patent Number: 4,920,541
[45] Date of Patent: Apr. 24, 1990

[54] APPARATUS FOR GENERATING VARIOUS LASER WAVELENGTHS FROM THE SAME LASER MEDIUM

[75] Inventors: Reinhold Baumgartner, Freising; Hans Lenz, Munich; Herbert Stepp, Gräfelfing; Eberhard Unsöld, Oberschleissheim, all of Fed. Rep. of Germany

[73] Assignee: Gesellschaft für Strahlenund Umweltforschung mbH, Munich, Fed. Rep. of Germany

[21] Appl. No.: 357,654

[22] Filed: May 25, 1989

Related U.S. Application Data

[63] Continuation of Ser. No. 155,593, Feb. 12, 1988, abandoned.

[30] Foreign Application Priority Data

Feb. 12, 1987 [DE] Fed. Rep. of Germany ....... 3704338

[51] Int. Cl.$^5$ ............................................. H01S 3/10
[52] U.S. Cl. ..................................... 372/23; 372/99; 372/20; 372/108
[58] Field of Search .................. 372/23, 99, 92, 108, 372/20

[56] References Cited

U.S. PATENT DOCUMENTS

| | | | |
|---|---|---|---|
| 3,443,243 | 5/1969 | Datel | 372/20 |
| 3,571,744 | 3/1971 | Hook et al. | 372/12 |
| 3,747,019 | 7/1973 | Koechner et al. | 372/10 |
| 3,772,609 | 11/1973 | Willett et al. | 372/23 |
| 4,063,106 | 12/1977 | Ashkin et al. | 372/100 |
| 4,425,648 | 1/1984 | Holly | 372/97 |
| 4,441,186 | 4/1984 | Erickson | 372/23 |
| 4,504,950 | 3/1985 | Auyeung | 372/20 |
| 4,556,979 | 12/1985 | Scott et al. | 372/20 |
| 4,637,026 | 1/1987 | Lin | 372/10 |
| 4,660,206 | 4/1987 | Halmos et al. | 372/20 |

OTHER PUBLICATIONS

Bethea; "Megawatt Power at 1.318u in Nd$^{t3}$, YAG and Simult. Oscillat. of both 1.06 and 1.318m", IEEE JQE Feb. 1983.

Primary Examiner—Léon Scott, Jr.
Attorney, Agent, or Firm—Spencer & Frank

[57] ABSTRACT

An apparatus for producing various laser wavelengths from the same laser medium by means of resonator mirrors. In accordance with the apparatus any desired, given combination of laser wavelengths can be brought to emission simultaneously or at least in very rapid alternation (switching time 1 ms) with the use of standard resonator mirrors linearly arranged outside of a laser medium, with part of at least one of the resonator mirrors being configured so that it serves as resonator limitation for a certain laser wavelength or wavelength group but another part of the at least one of the resonator mirrors constitutes an intracavity element for the respective other wavelength(s) or wavelength group(s).

12 Claims, 2 Drawing Sheets

APPARATUS FOR GENERATING VARIOUS LASER WAVELENGTHS FROM THE SAME LASER MEDIUM

This is a continuation of application Ser. No. 07/155,593, filed Feb. 12, 1988.

BACKGROUND OF THE INVENTION

The present invention relates to a device for generating various laser wavelengths from the same laser medium by using resonator mirrors.

In the past, a change between various laser wavelengths from one laser medium (e.g. Ar+, Kr+, Nd:YAG laser) was effected by changing the resonator mirror or by inserting frequency selective elements into the laser resonator (e.g. dye lasers). Frequency selective elements in this sense are, for example, prisms or doubly refracting filters (Lyot filters), Fabry-Perot filters or gas pressure cells. The desired effect is obtained by tilting or turning the components or by changing the gas pressure.

The tuning range realizable with these above-mentioned elements is limited by the spectral widths of the laser emission conditions made possible by the resonator mirror coatings. If the requirements of the user cannot be met by the standard supply of resonator mirrors, an expensive and time consuming development of special resonator mirror coatings becomes necessary. The realizable speed of the switch between various laser wavelengths is limited by the relatively large mechanical adjustment paths that become necessary. If frequency selective intracavity elements are employed, on the other hand, only a very narrow spectral range can be brought to emission at any one time. Light intensity control and regulation is customarily effected by a change in the pumping power or by additional intracavity elements (e.g. iris aperture). Although light intensity regulation is possible with these methods, it requires additional engineering expenses or is possible only within narrow limits and/or at a slow regulating speed (see for example, Spectra-Physics, U.S.A.; Instruction Manual 171 Ion Laser (C/171 9/77)).

SUMMARY OF THE INVENTION

It is an object of the present invention to configure a device of the above-mentioned type so that any desired given combination of laser wavelengths can be interchangeably brought to emission and with the correct light intensity, either simultaneously or at least in rapid alternation (switching time 1 ms).

A solution of this problem is obtained in accordance with the invention by a device for producing various laser wavelengths from the same laser medium, which includes a linear arrangement of the resonator mirrors outside of the laser medium, with part of at least one of the resonator mirrors being configured in such a manner that it serves as a resonator limitation for a certain laser wavelength or wavelength group, while another part of the at least one of the resonant mirrors constitutes an intracavity element for the respective other wavelength(s) or wavelength group(s).

Thus, the present invention provides that a plurality of resonator mirrors are aligned in linear arrangement and the resonator paths are decoupled for various laser wavelengths outside of the laser medium, with the light intensity of the different laser wavelengths being regulated separately to desired values by means of electromechanic adjustment in a closed regulating circuit.

The following points are considered to be significant for the device according to the invention:

a combination of more than two standard resonator mirrors in a linear arrangement is provided;

the spectral distribution of the emitted laser wavelengths is broader than if only two resonator mirrors were used;

high switching and regulating frequency is realized by way of short adjustment paths and the use of elements which do not operate mechanically;

switching and light intensity regulation of several basically arbitrary laser wavelengths (laser wavelength groups) are provided from one laser medium.

The advantages that can be realized with the present invention are, in particular, that the combination of standard resonator mirrors permits emission of additional laser wavelengths (wavelength groups) without costly new development of resonator mirror coatings. Since this is accomplished without the use of a plurality of laser media, apparatus costs remain low compared to systems which operate, for example, with a plurality of dye lasers. Moreover, not only can a switch be made between any desired individual laser wavelengths, but also between laser wavelength groups and this can be done at a greater speed than in the past and at a frequency which is controllable over a wide range and also externally. Additionally, the present invention makes possible the use of a simple type of light intensity regulation and noise suppression in a closed control circuit as well as pulsed laser light emission or a laser light emission which is intensity modulated as desired. Moreover, all described functions can be actuated through customary laboratory computers without requiring major additional expenditures. This permits integration of the modified laser system in connected experiments (e.g. fluorescence diagnosis). The above-mentioned realizable advantages make it possible, with a slight modification in the sets of standard resonator mirrors and inclusion of a series thereof in the apparatus on which the invention is based, to meet the requirements for use of multi-color or switchable laser wavelength and light intensity controllable laser systems much more extensively and economically than before.

BRIEF DESCRIPTION OF THE DRAWINGS

The invention will now be described in greater detail with reference to embodiments that are illustrated in the accompanying drawings in which.

DESCRIPTION OF THE PREFERRED EMBODIMENTS

Figure 1:
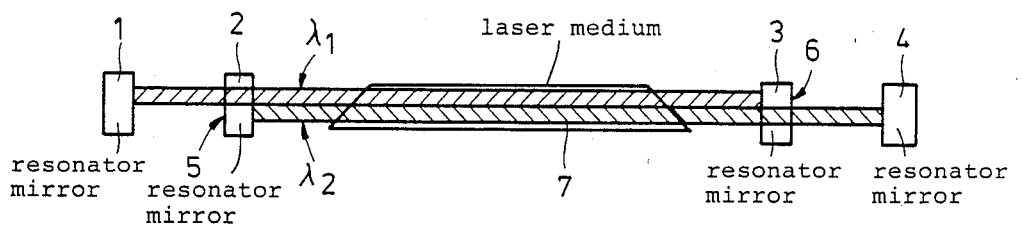
FIGS. 1 and 2 schematically illustrate a first embodiment of the apparatus of the invention.

The linear arrangement of four resonator mirrors 1 to 4 shown as an example in FIG. 1 makes it possible to simultaneously meet the laser emission conditions for a plurality of laser wavelengths $\lambda_1$, $\lambda_2$ or all laser wavelengths of the otherwise only selectively usable laser wavelengths from laser medium 7 by a combination of resonator mirrors 1 and 3 or 2 and 4, respectively. The only condition for this is, if required, that the rear surfaces 5, 6 (identified by an arrow) of resonator mirrors 2 and 3 be made non-reflective. In this example, these mirrors each constitute a resonator boundary for a possible laser wavelength (group) $\lambda_1$, and $\lambda_2$, respectively, while they represent an intracavity element for the respectively other laser wavelength (group) and should therefore have the lowest possible losses for these wavelengths.

The region of the two laser wavelegths (wavelength groups $\lambda_1$, $\lambda_2$) is shown as cross hatched areas in FIG. 1. By selecting the position of the partially transmitting resonator mirrors 5 and 6 which are required for light emission from the respective resonator, the two laser wavelengths (wavelength groups) are able to exit at the same end or at opposite ends of the total arrangement. For the purpose of adjustments, resonator mirrors 1 to 4 are advisably mounted on x/y adjustment mounts (not shown) which can be finely adjusted independently of one another.

By the inclusion of further resonator mirrors in the arrangement, further laser wavelengths (wavelength groups) can be brought to emission. By selecting or producing suitable resonator mirror coatings, two or more of the resonator mirrors can also be replaced by a single resonator mirror.

Switching and light intensity regulation can be effected in principle in various ways.

The principle involved will be explained with reference to the exemplary arrangement shown in FIG. 2 for two laser wavelengths (wavelength groups) by means of piezo translators 8 and 9.

All resonator mirrors 1 to 4 are again mounted in mutually independently finely adjustable x/y adjustment units. The horizontal (or vertical) tilting of resonator mirrors 1 and 4 is additionally electromechanically actuatable by means of piezo translators 8 and 9. Mirrors 1 and 2 are disposed, for example, on the left side of laser medium 7; laser wavelength $\lambda_2$ is likewise able to leave the total arrangement on this side.

By means of a divider mirror 10, a small percentage of the coupled-out light intensity is directed as partial beam 11 onto a photodetector 12. The electrical signal 13 generated by photodetector 12 serves as the actual value for an electronic regulating system 14.

The laser light intensity 11 that can be coupled out depends on the quality of the optical resonator in which laser medium 7 is disposed. The quality of the optical resonator also depends, inter alia, on the parallelity of resonator mirrors 1 to 4 and can be set to any value between zero and a maximum by directly moving the resonator mirrors out of their optimum position.

The actual value 13 provided by photodetector 12 is now compared with an internally or externally given and variable desired value and piezo translators 8 and 9 are actuated via actuating devices 15 and 16 in such a manner that a change in the tilt angle of resonator mirrors 1 and 4 connected with piezo translators 8 and 9, respectively, results in a change of the emitted light intensity which minimizes the regulating deviation.

Internal or external switching pulses perform the switch between the two actuating devices 15 and 16. The resonator mirror which is not intended to contribute to emission is brought by one actuating device into a position (greatly out of alignment) which does not permit laser light emission, while the respective other actuating device is employed to effect a regulation to the desired value for the other laser wavelength.

This apparatus can also be expanded to further laser wavelengths (wavelength groups) by the addition of further piezo translator actuated resonator mirrors. Again, two or more individual resonator mirrors, if required, may be replaced by one suitably coated resonator mirror.

Figure 2:
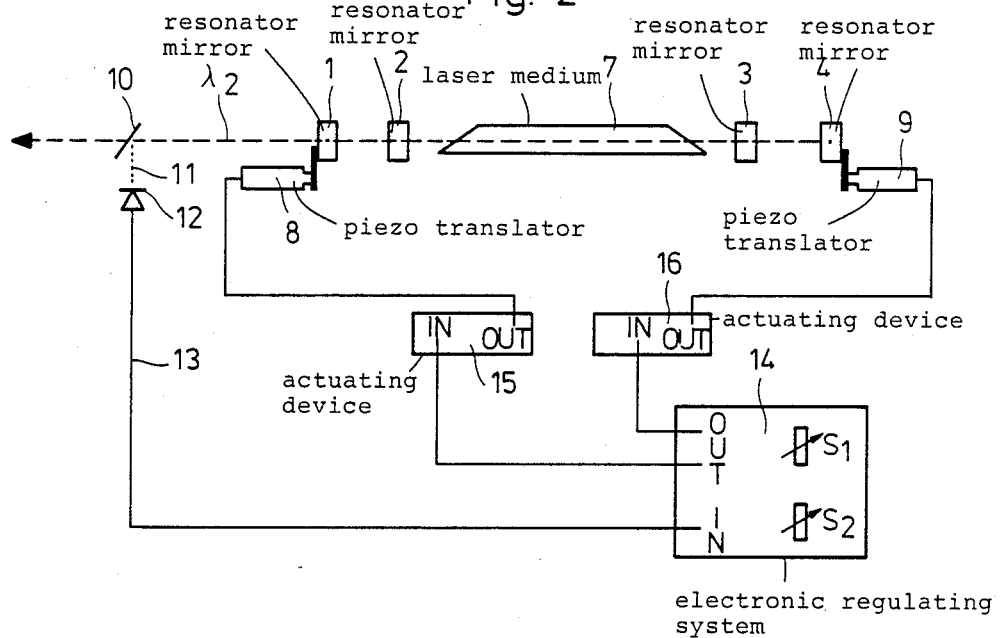

In addition to the example shown in FIG. 2 for changing the quality of the optical resonator by means of piezo element controlled resonator mirrors, the following variations shown in FIGS. 3 to 6 are also conceivable.

Figure 3:
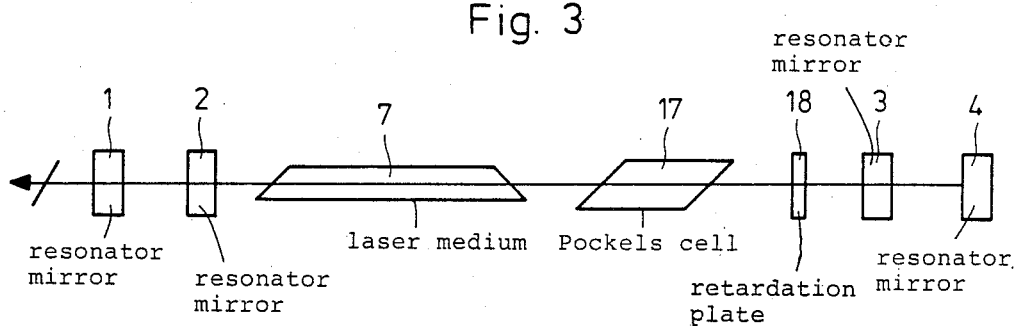
FIGS. 3, 4, 5, and 6 respectively schematically illustrate second, third, fourth, and fifth embodiments of the apparatus of the invention.

In the apparatus shown in FIG. 3, a switch between laser wavelengths (wavelength groups) and their light intensity regulation is effected with the aid of a Pockels cell 17 and retardation plate 18. Since the degree of change in the direction of polarization is a function of polarized light wavelengths, different laser wavelengths will impinge on retardation plate 18 with a different degree of elliptical polarization after passing through Pockels cell 17. By slightly changing the voltage across Pockels cell 17, it is again possible to effect light intensity regulation. This results in the advantage that no mechanical adjustment paths are required for switching and regulation but also in the drawback that the resonator has more loss producing surfaces and manual adjustment of the resonator mirrors becomes necessary.

Figure 4:
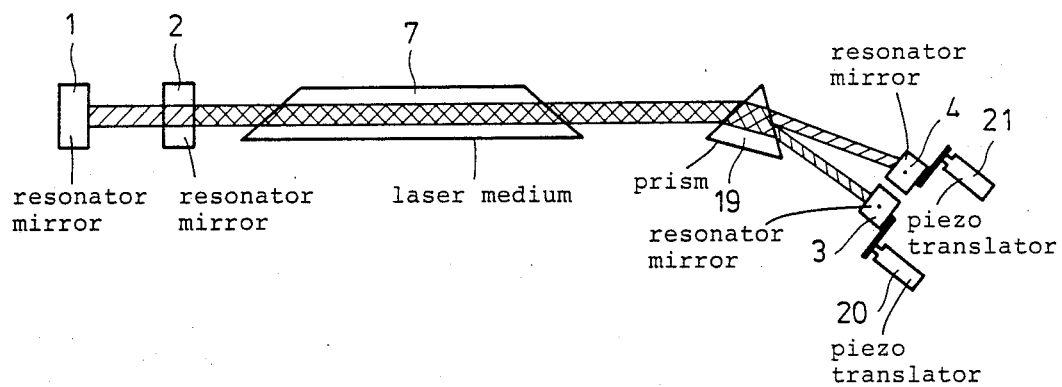

FIG. 4 shows an arrangement including a prism 19 as the wavelength selective element and the two resonator mirrors 3 and 4 which are actuated by means of piezo elements 20 and 21. Mirrors 3 and 4 are used for switching and regulating and are both disposed on the same side of prism 19, i.e. the side facing away from the laser medium. An advantage results from the fact that fewer intracavity elements, which are not arranged at a Brewster angle, are required while the drawback results that basic adjustment is possible without great expenditures only with an identical wavelength adjustment laser.

Figure 5:
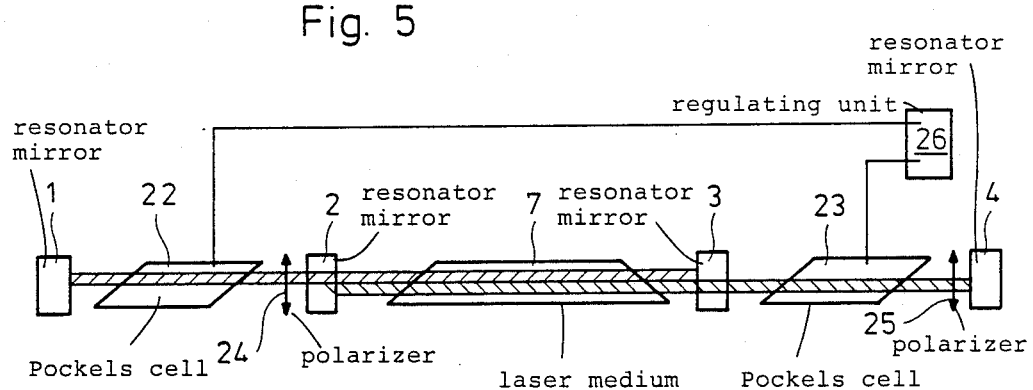

FIG. 5 depicts an arrangement in which switching and regulating is effected in the decoupled portion of the resonator path by means of low-loss light modulators from one of two Pockels cells 22 and 23 equipped with polarizers 24 and 25. If light intensity regulation (by way of regulating unit 26) can be omitted for at least one laser wavelength, light modulators 22 to 25 can also be replaced by a small glass plate or gray filter that can be tilted into the beam path instead of Pockels cell 22 and a closable aperture or the like instead of Pockels cell 23. The advantage is then that no mechanical switching and regulating paths are necessary if Pockels cells 22 and 23 are employed while the drawback remains that many intracavity elements are present if the Pockels cells are employed and at least one laser wavelength cannot be regulated in light intensity in the simple variation.

Figure 6:
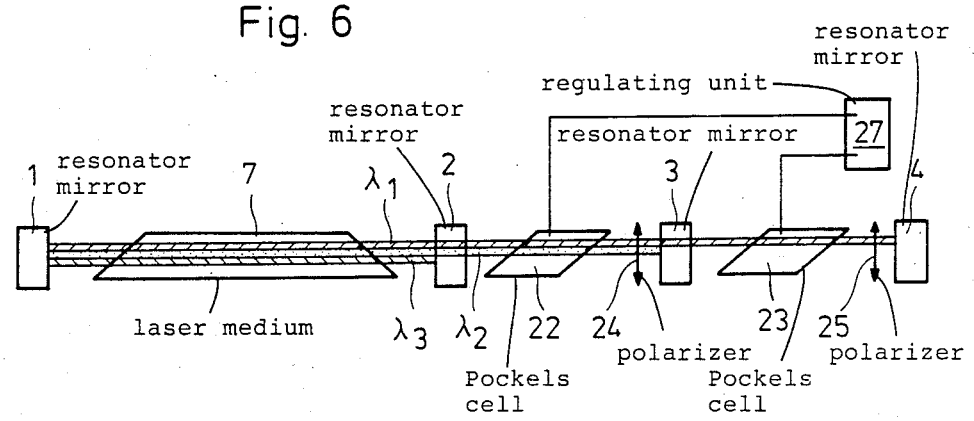

FIG. 6 shows a way in which the use of light modulators, such as the combination of Pockels cells 22 and 24 and polarizers 23 and 25, respectively, as shown in FIG. 5, makes it possible in a simple manner to switch between different laser wavelengths $\lambda_1$-$\lambda_3$ if the latter differ from one another in their amplification factor in laser medium 7. Resonator mirrors 1 to 4 are then arranged in such a manner that the resonator mirror (e.g. mirror 2) equipped with the coating for the weakest laser wavelength is seated on the inside, while the mirror (e.g. mirror 4) equipped with the coating for the strongest laser wavelength is seated on the outside.

With appropriate synchronization, the listed controls including regulating units 14 to 16, 26, 27 can also be used for quasi-continuous lasers which emit pulse trains, e.g. copper vapor lasers. Switching to different wavelengths can even be effected with single pulse lasers, in this case from pulse to pulse. A further possible field of use is in criminology for laser induced fluorescence examinations of fingerprints, fibers, dyes, documents, pictures and paintings.

One example of such use, the hematoporphyrin derivative supported fluorescence diagnosis employing two wavelength excitations. This example is based on the arrangement shown in FIG. 2. The components identified there have the following specifications:

v=violet=406.7 nm+413.1 nm+415.4 nm b=blue=468.0 nm+476.2 nm+482.5 nm

| resonator mirror 1 | reflection (%) from 18.8 to 27.6 |
| resonator mirror 2 | reflection (%) from 97.7 to 75.0 |
| resonator mirrors 1 and 2 | reflection (%) from 98.0 to 82.0 |
| resonator mirror 3 | reflection (%) from 48.7 to 98.4 |
| resonator mirror 4 | reflection (%) from 99.9 to 61.0 |
| resonator mirrors 3 and 4 | reflection (%) from 99.9 to 99.6 |

Due to the exclusive use of standard resonator mirrors, the theoretically optimum values are not attained and decoupling of the resonator paths would not be complete.

Approximately optimum would be the following reflection percentages:
resonator mirror 1-from 0 to 98.5
resonator mirror 2-from 97.5 to 0
resonator mirror 3-from 0 to 100
resonator mirror 4-from 100 to 0

Laser medium 7 krypton gas (conherent crypton ion laser CR 3000 Innova); coupling-out mirror 10 is a simple glass plate. A displaceable gray wedge (not shown) in front of photodiode 12 permits matching of the light intensity of partial beam 11 to the sensitivity of the photodiode. The electrical signal 13 is intially fed to a measuring amplifier disposed in the housing of unit 14. The thus processed "light intensity" is compared with a desired voltage that can be set by means of a potentiometer and a regulating signal is generated by means of PID regulating stages (in the manner of an operational amplifier structure). This regulating signal controls piezo drivers 15, 16 (Burleigh PZ 150 amplifier, 0—10V→0—150V) in such a manner that the change in the parallel position of the respective resonator mirrors finally performed by the piezo elements 8, 9 (Burleigh PZO 030, stroke 30 μm) changes the light intensity in such a way that the difference between measuring amplified signal 13 and the desired voltage decreases.

Electronic switches take care of switching the regulating paths between the two piezo drivers and the corresponding desired value generators. Further circuit elements permit "searching", that is, sawtooth-like scanning of the entire deflection range, with the light emission not yet existing (switched on) or lost due to heavy interference. The switching signal and desired voltage may also be given externally. In practice this is effected by way of digital and analog output boards connected to a computer (Eltec: E3-221 (Motorola MC68010), APAL-1, ADDA-1). In synchronism with the laser setting values generated by the computer, an image amplifier camera is actuated to detect locally resolved fluorescence and the video signal generated by the camera is stored digitally (256×256 pixels each having 7 to 8 bits of gray value depth). Then the wavelength is switched and the fluorescence image now excited by the other wavelength is stored. The displayed image is a difference image which reflects the distribution of those substances (here the tumor marking hematoporphyrin derivative) with the most contrast whose fluorescence excitation intensities differ most from one another at the two excitation wavelengths.

Further specifications realized with the two-wavelength laser system are:

| power | maximum from 1.5 W to 0.15 W |
| regulated power | maximum from 1.1 W to 0.12 W |
| switching time | <1 ms |
| switching frequency | 0 to 600 Hz |
| noise suppression | 0 to 150 Hz 20 dB |
| | 150 to 500 Hz 10 dB |

Particularly for the output power in the blue spectral range, reserves still exist due to the use of a resonator mirror which is highly reflective in the blue range instead of resonator mirror 3 and a mirror having greater reflectivity instead of resonator mirror 1.

The present disclosure relates to the subject matter disclosed in Federal Republic of Germany Patent Application No. P 37 04 338.2, filed Feb. 12th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a laser device for producing laser light outputs having various groups of laser wavelengths from a same laser medium with the use of resonator mirrors, the laser device having a laser cavity and resonator mirrors, the laser medium being disposed in the cavity, two of the resonator mirrors being end resonators disposed at opposite ends of the cavity on opposite sides of the laser medium, the improvement wherein the resonator mirrors include at least four resonator mirrors linearly arranged outside of the laser medium, two of which are the end resonator mirrors and at least two of which are disposed between the end resonator mirrors and serve as respective resonator boundaries for respective ones of the various groups of laser wavelengths and constitute respective intracavity elements for the other of the various groups of laser wavelengths, transmitting the others of the various groups of laser wavelengths therethrough, the device further comprising means for at least one of switching and regulating the intensity of the wavelength groups, said means including means for tilting said two end resonator mirrors.

2. A laser device as in claim 1, wherein said resonator boundaries are disposed on opposite sides of said laser medium.

3. A laser device as in claim 2, wherein each of the resonator mirrors which has one side which is non-reflective.

4. A laser device as in claim 1, wherein each of the resonator mirrors which constitutes a respective intracavity element has one side which is non-reflective.

5. A laser device as in claim 1, wherein each of the resonator mirrors which constitutes a respective intracavity element has one side which is non-reflective.

6. A laser device as in claim 5 wherein said means includes Pockels cells and polarizers in said cavity between said two end resonator mirrors, the two resonator boundaries being disposed on opposite sides of said laser medium, the Pockels cells including a first Pockels cell disposed between the end resonator mirror and resonator boundary on one side of the laser medium, and a second Pockels cell disposed between the end resonator mirror and resonator boundary on the other side of the laser medium, the polarizers including a first polarizer between the first Pockels cell and the resonator boundary of said one side of the laser medium, and a second polarizer between the second Pockels cell and the end resonator mirror on said other side of the laser medium.

7. A laser device as in claim 5 wherein said means includes Pockels cells and polarizers in said cavity between said two end resonator mirrors, the two resonator boundaries including first and second resonator boundaries disposed on a same side of said laser medium with the second resonator boundary being disposed between the end resonator mirror on said same side and the first resonator boundary, the Pockels cells including a first Pockels cell disposed between the first and second resonator boundaries, and a second Pockels cell disposed between said end resonator mirror on said same side and the second resonator boundary, the polarizers including a first polarizer between the first Pockels cell and the second resonator boundary, and a second polarizer between the second Pockels cell and said end resonator mirror on said same side.

8. A laser device as in claim 5, further comprising means for coupling out of the laser light output a partial beam of laser light, the device further comprising means, responsive to the partial beam, for regulating the light intensity of the laser light output.

9. In a laser device for producing laser light outputs having various groups of laser wavelengths from a same laser medium with the use of resonator mirrors, the laser device having a laser cavity and resonator mirrors, the laser medium being disposed in the cavity, two of the resonator mirrors being end resonators disposed at opposite ends of the cavity on opposite sides of the laser medium, the improvement wherein the resonator mirrors include at least four resonator mirrors linearly arranged outside of the laser medium, two of which are the end resonator mirrors and at least two of which are disposed between the end resonator mirrors and serve as respective resonator boundaries for respective ones of the various groups of laser wavelengths and constitute respective intracavity elements for the other of the various groups of laser wavelengths, transmitting the others of the various groups of laser wavelengths therethrough, the device further comprising means for at least one of switching the wavelength groups and regulating an intensity of the wavelength groups, said means including a Pockels cell and a retardation plate in said cavity between said two end resonator mirrors.

10. A laser device as in claim 9, wherein said retardation plate is disposed between said laser medium and a resonator limitation of the at least one resonator mirror and said Pockels cell is disposed between said laser medium and said retardation plate.

11. In a laser device for producing laser light outputs having various groups of laser wavelengths from a same laser medium with the use of resonator mirrors, the laser device having a laser cavity and resonator mirrors, the laser medium being disposed in the cavity, two of the resonator mirrors being end resonators disposed at opposite ends of the cavity on opposite sides of the laser medium, the improvement wherein the resonator mirrors include at least four resonator mirrors linearly arranged outside of the laser medium, two of which are the end resonator mirrors and at least two of which are disposed between the end resonator mirrors and serve as respective resonator boundaries for respective ones of the various groups of laser wavelengths and constitute respective intracavity elements for the other of the various groups of laser wavelengths, transmitting the others of the various groups of laser wavelengths therethrough, the device further comprising means for switching between the wavelength groups without spatial separation.

12. A method of performing a laser induced fluorescence examination using a laser device for producing laser light outputs having various groups of laser wavelengths from a same laser medium with the use of resonator mirrors, the laser device having a laser cavity and resonator mirrors, the laser medium being disposed in the cavity, two of the resonator mirrors being end resonators disposed at opposite ends of the cavity on opposite sides of the laser medium, the improvement wherein the resonator mirrors include at least four resonator mirrors linearly arranged outside of the laser medium, two of which are the end resonator mirrors and at least two of which are disposed between the end resonator mirrors and serve as respective resonator boundaries for respective ones of the various groups of laser wavelengths and constitute respective intracavity elements for the other of the various groups of laser wavelengths, transmitting the others of the various groups of laser wavelengths therethrough, the device further comprising means for switching between the wavelength groups without spatial separation, the method comprising the steps of:

directing a first laser wavelength from the device onto a target to be examined;

detecting and storing a first fluorescence image of the target during the step of detecting with the first laser wavelength;

switching the output of the device to a second wavelength with the means for switching and directing the second wavelength onto the target;

detecting and storing a second fluorescence image of the target during the step of detecting with the second laser wavelength; and forming and displaying a differece image representing the difference in intensity of the first and second fluorescence images.

* * * * *